United States Patent [19]

Orlander et al.

[11] 4,414,016
[45] Nov. 8, 1983

[54] APPARATUS FOR THE PELLETIZATION OF HEAT-LIQUIFIABLE SOLID MATERIALS

[75] Inventors: Michael Orlander, Dundas; Robert P. Cotsworth; Peter A. MacKenzie, both of Hamilton, all of Canada

[73] Assignee: National Slag Limited, Hamilton, Canada

[21] Appl. No.: 377,871

[22] Filed: May 13, 1982

[51] Int. Cl.³ ............................................. C03B 19/04
[52] U.S. Cl. ............................................. 65/141; 65/19; 65/21.2; 75/24; 266/137; 266/204; 264/5; 264/11
[58] Field of Search .................... 65/19, 20, 21.1, 21.2, 65/21.3, 21.5, 141; 75/24; 266/137, 201, 204; 264/5, 11

[56] References Cited

U.S. PATENT DOCUMENTS

| | | | |
|---|---|---|---|
| 2,210,999 | 8/1940 | Bartholomew | 83/91 |
| 2,308,769 | 1/1943 | Meinzer | 65/20 |
| 3,148,763 | 9/1964 | Suwada et al. | 198/57 |
| 3,523,775 | 8/1970 | Rueckl | 65/19 |
| 3,594,142 | 7/1971 | Margesson et al. | 65/19 |
| 4,115,089 | 9/1978 | Metz et al. | 65/19 |
| 4,153,440 | 5/1979 | Legille et al. | 65/19 |
| 4,268,295 | 5/1981 | Yamamoto et al. | 65/19 |
| 4,274,527 | 6/1981 | Baker | 193/32 |
| 4,277,273 | 7/1981 | Legille et al. | 65/19 |

FOREIGN PATENT DOCUMENTS 54-12916 5/1979 Japan ............................................. 75/24

Primary Examiner—Arthur D. Kellogg
Attorney, Agent, or Firm—Hirons, Rogers & Scott

[57] ABSTRACT

Apparatus for the pelletization of heat-liquifiable materials, such as metallurgical slags, consists of feed means for the molten material, these feed means depositing the material on a downwardly-extending feed plate over which it flows while it is mixed with water, if water is necessary to promote the expansion of the molten material and for control of the cooling. The material then flows on to a first rotating radially-vaned drum or rotor by which it is projected into the air for simultaneous cooling and pelletization. The feed means comprises flow control means such that any flow greater than a predetermined maximum is fed onto a second feed plate disposed above the first, from which the excess molten material flows on to a second rotating radially-vaned drum or rotor operative in like manner to the first. The flow control means may comprise for example a dam over which the excess material flows. Preferably both of the feed plates are mounted to vibrate and are vibrated by a rotating eccentric weight to reduce adhering of the material to the feed surface plate by thus reducing the heating thereof.

8 Claims, 2 Drawing Figures

APPARATUS FOR THE PELLETIZATION OF HEAT-LIQUIFIABLE SOLID MATERIALS

FIELD OF THE INVENTION

The present invention is concerned with improvements in or relating to apparatus for the pelletization of molten heat-liquifiable solid materials, examples of which are metallurgical slags, glasses, sulphur and molten metals.

REVIEW OF THE PRIOR ART

Processes and apparatus for the pelletization of various heat-liquifiable materials, such as those mentioned above, are now well-known. A prior process and apparatus intended especially for the pelletization of metallurgical slags are disclosed in U.S. Pat. No. 3,594,142, assigned to the assignee of this application; this specification describes what is believed to be the first process by which it was possible to convert metallurgical slags consistently and economically into generally-spherical, closed-surface pellets which have a vesicular interior. The application of our prior process to the pelletization of such materials also resulted in a substantial reduction in the amount of water required for treatment of the slag, and also in the amount of noxious gaseous emissions obtained as compared with other slag handling systems employed at that time, such as pit granulation.

The pelletization apparatus employed in that prior process consists of an axially elongated cylindrical rotor that is rotated about its longitudinal cylindrical axis, which is horizontal. The rotor has around its periphery a number of radially-outwardly extending horizontal vanes and the molten slag to be pelletized, mixed with a predetermined amount of water, passes downwards under gravity over an interaction surface for a sufficient time for the slag and water mixture to reach a pyroplastic state, and then discharges onto the rotor periphery and is thrown by the vanes through the air a sufficient distance and for a sufficient time for it to cool and form self-sustaining spherical pellets. This apparatus has now been employed very successfully in a number of installations for the pelletization of many different kinds of slags.

A number of problems are encountered in practice which this basic apparatus is not able to solve expediently. For example, it is desirable for the flow of slag to be as uniform as possible, and to this end in the original process described in the prior specification the blast furnace slag was tapped into a ladle, from which it was poured into the pelletization apparatus at a controlled uniform flow rate, so as to ensure that the slag/water ratio remained within the required limits. However, it is essential for maximum economy in operation that the molten slag be fed directly by a runner from the slag-producing source, such as a furnace, to the pelletizer, and control of the flow rate is then much more difficult. Conditions at the furnace often vary during the tapping process and result in variable flow rates of molten slag.

It has been found to be advantageous for optimum operation for the vanes to be kept fully "loaded" with slag, but the loading on to any part of the rotor should not rise above a maximum value, or that part will become "flooded" and lose effectiveness.

This particular problem is rendered more acute by the difficulty found in making the flowing molten material spread out over a surface, its viscosity and surface energy being such that it tends to try to "gather" into a more compact stream that can cause the flooding mentioned above.

One prior solution to the problem is to arrange that when the flow is greater than the required maximum the surplus is diverted to a quenching pit, which is usually provided in any case as a safety feature to receive the slag directly if the pelletizing apparatus should be out of operation for any reason. This surplus is then in the less-commercially desirable air-cooled slag form. Another solution is to provide two rotors side-by-side and arrange that any flow above a predetermined maximum for the first rotor is instead fed to the second rotor, but this results in runners of objectionable length and may not always be possible in situations where the space available close to the source of the molten material is not sufficient to accommodate the larger apparatus and the larger deposit space required for the pellets.

DEFINITION OF THE INVENTION

It is therefore the principal object of the invention to provide a new pelletization apparatus able to operate successfully with a relatively wide range of rates of flow of the molten material fed thereto.

It is another object to provide such apparatus that is of relatively compact configuration to permit installation and operation thereof in a correspondingly confined space.

In accordance with the present invention there is provided an apparatus for the pelletization of molten heat-liquifiable solid material comprising:

an apparatus frame, feed means providing a primary discharge means for molten material up to a predetermined flow rate, and a secondary discharge means for excess molten material when the flow rate of the material fed thereto is greater than said predetermined flow rate, first and second feed plates mounted by the frame one above the other to receive respectively material from the primary and secondary discharge means and providing respective first and second feed surfaces over which the received molten material flows under gravity, first and second radially-vaned projecting rotors mounted by the frame for rotation about respective horizontal axes and on to the respective peripheries of which the molten material is fed respectively from the first and second feed surfaces for projection into the air for cooling and pelletization thereof, and motor means for rotating the two rotors about their respective axes in the respective required directions.

DESCRIPTION OF THE DRAWINGS

Apparatus which is a particular preferred embodiment of the invention will now be described, by way of example, with reference to the accompanying diagrammatic drawings wherein.

DESCRIPTION OF THE PREFERRED EMBODIMENTS

Figure 1:
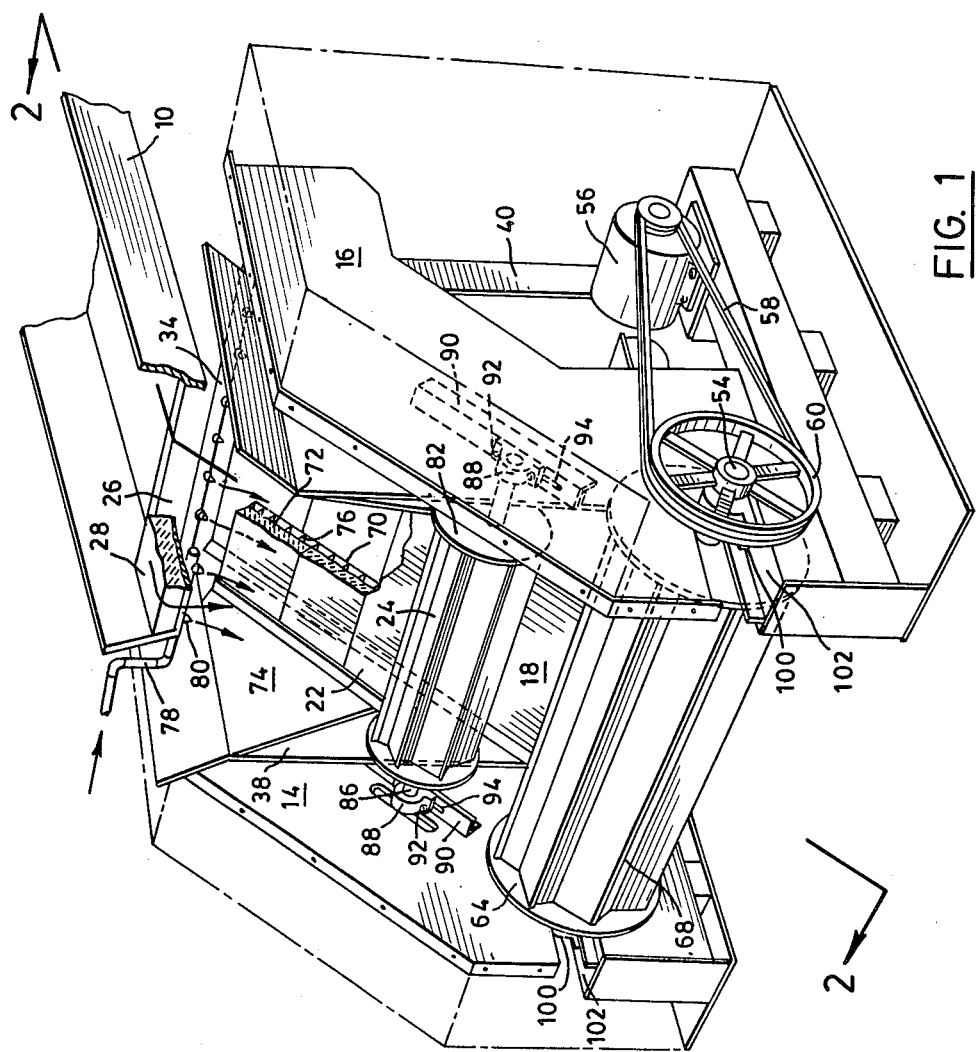
FIG. 1 is a perspective view of projection apparatus of the invention, parts thereof being shown in broken lines and in phantom, as is necessary for clarity of illustration.
Figure 2:
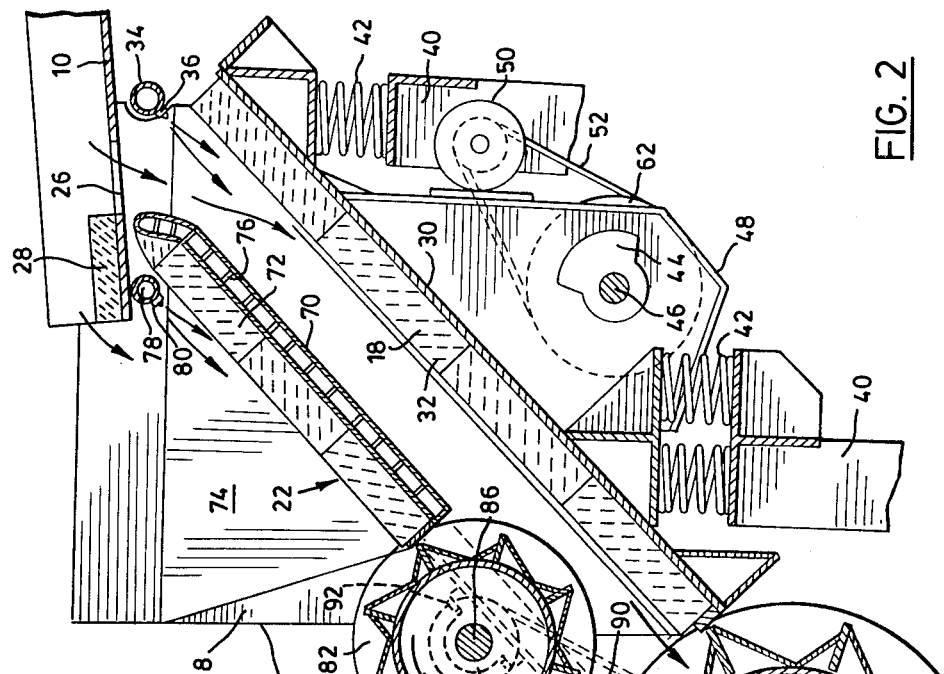
FIG. 2 is a longitudinal cross-section taken on the line 2—2 of FIG. 1.

The pelletization process is carried out, as described in our prior U.S. Pat. No. 3,594,142, by projecting the molten material into the air over a pit or other collection area from which the cooled pelletized material is removed by any conventional means, and the pelletization apparatus accordingly is mounted at the edge of the collection area and conveniently close to the source of the molten material, such as a blast furnace (not shown), from which the material is fed via a runner 10 upon tapping of the furnace.

The apparatus consists of an apparatus frame, identified generally by the reference 12, consisting of two spaced side members 14 and 16 that support between themselves the various principal operative elements of the apparatus, namely a first downwardly-inclined feed plate 18, a respective first vaned projecting rotor 20, a second downwardly-inclined feed plate 22 disposed above the first feed plate, and a respective second vaned projecting rotor 24.

The runner 10 consists of a chute having in the floor thereof a transverse slot 26 constituting a primary discharge means for the molten material flowing along the runner. The downstream edge of the slot is provided with a transverse dam 28 so as to ensure that all of the molten material below a predetermined flow rate, as determined by the dimensions of the slot 26 and the dam 28, will flow through the slot onto the lower feed plate 18. If the flow is greater than this predetermined rate, then the excess will flow over the dam and over the end of the chute on to the second upper feed plate 22. The dam and chute end therefore constitute a secondary discharge means for the excess molten material that is not able to flow through the primary discharge means slot.

The first lower feed plate consists of a flat metal base plate 30 supporting a plurality of blocks 32 of highly heat-resistant material, such as graphite, the upper surfaces of which constitute the interaction feed surface over which the molten material flows under gravity while interacting with water, supplied for example from respective supply pipe 34 and nozzles 36, so that it will achieve the desired pyroplastic state by the time that it reaches the respective first projecting rotor 20. Sidewalls 38 are provided to confine the material flow to the feed surface, and the entire feed plate is spring-mounted on the apparatus frame and constantly vibrated to assist in preventing any sticking of the molten material to the feed plate surface. Thus the plate is supported from standards 40 of the frame by interposed compression coil springs 42 disposed with their compression axes vertical. A random vibration is produced by the impact of the molten slag falling from the runner 10 on to the plate, and this is superimposed upon a constant forced vibration produced by a rotating eccentric weight 44 carried by a rotatable horizontal shaft 46 mounted between downwardly-extending side walls 48 of the plate. The shaft 46 is rotated by drive motor 50 via belt 52.

The first projecting rotor 20 consists of two spaced parallel circular side plates 64 between which extends a horizontal cylinder 66 coaxial with a drive shaft 54 on which it is mounted. The cylinder is of circular cross-section and its periphery is provided with a number of radially-outwardly extending throwing vanes 68 that engage the molten material discharging from the feed plate 18 at the required circumferential location to throw it into the air for cooling and pelletization as previously described. To this end the rotor rotates anti-clockwise as seen in the drawings and is driven from a motor 56 via a belt 58 and pulley 60 on the shaft 54. The rotor is cooled during operation by supplying cooling water to the interior of the drum, and also if required by spraying water on to its exterior; these and other cooling arrangements will be apparent to those skilled in the art and need not be further described.

The second feed plate is mounted on the support structure of the first plate so as to vibrate therewith, and to this end it has a flat hollow metal base plate 70 supporting a plurality of blocks 72, the base plate being connected to the sidewalls 38 via its own side walls 74. The hollow base plate is provided with partitions 76 to form corresponding channels through which cooling water is passed in order to cool the plate; this cooling is required since the top plate is subjected to heat both from its own load of molten material and that flowing down the first plate below. The water required for mixing with the material flowing on this second plate is provided from respective supply pipe 78 and nozzles 80. The first feed plate 18 can also be of water-cooled construction, as with the second plate, and for both feed plates it may be found that the provision of a graphite feed surface is not required, and a water-cooled metal surface is adequate.

This second rotor also consists of two spaced parallel end-plates 82 between which extends a horizontal cylinder 84 of circular cross-section coaxial with its drive shaft 86, the ends of which are mounted in respective bearing blocks 88 so that it rotates about a horizontal axis parallel to and spaced from that of the first rotor 20. The blocks 88 are movably mounted on respective angle members 90 which are fixed to the side frame members 14 and 16 so as to extend parallel to the said feed surface. Thus, as illustrated bolts 92 holding the blocks 88 to the members 90 are movable in longitudinal slots 94 so that the position of the second rotor relative to its feed plate can be adjusted. The height of the second rotor relative to its feed plate can be adjusted most conveniently by the insertion of shims of the required thickness between the blocks and their supporting members. The second rotor is rotated anti-clockwise as seen in the figures from the motor 56 and the first rotor shaft 54 via a belt 96 and pulley 98 on the shaft 86. The second rotor also can be cooled by the passage therethrough of cooling water supplied to its interior in any known manner.

The position of the first rotor relative to its feed plate can be adjusted in like manner, its drive shaft 54 being rotatable in bearing blocks 100 mounted on horizontal surfaces 102 so as to be adjusted in the same manner as the bearing blocks 88 for the shaft 86. The positioning of the second rotor relative to its feed plate is not as critical as that between the first rotor and feed plate since any material that falls between the second rotor and second feed plate edge falls onto the first feed plate and is processed by the first rotor.

It will be seen that apparatus of the invention is able to provide for increased pelletization capacity without substantial increase in the space required by the apparatus, or in the pick-up space into which the pelletized material is projected. More importantly the distance over which the molten slag must pass from its source to both of the feed plates can be kept as short as with a single feed plate and rotor, minimising any deleterious cooling thereof that would be caused by a long runner.

It will also be noted that the second top rotor is of substantially smaller diameter than the first rotor, so that the overall height of the apparatus can be kept as low as possible, and also so that the trajectory of material thrown from the upper rotor can be made more readily to coincide with that of the first rotor. The number of vanes on the upper rotor is reduced so that they can be of the same dimensions as those on the lower larger rotor, while the speed of rotation is increased in order to maintain the peripheral speed and vane impact frequency substantially the same. In a specific embodiment the first rotor has eight vanes, a peripheral diameter of 84 cm. and is rotated at about 200–400 r.p.m., while the second rotor has six vanes, a peripheral diameter of 57 cm. and is rotated at a speed such as to give comparable peripheral velocity to that of the first rotor.

Apparatus of the invention has the further advantage that the first rotor can be designed to operate substantially fully loaded with material at all times, since it is no longer necessary to design it with reserve capacity, such excess being handled instead by the second rotor. It is found that for optimum performance such constant high loading is highly desirable, but has been extremely difficult to achieve hitherto unless one of the more expensive prior art solutions is adopted, assuming of course that there has been room for such adoption.

The apparatus of the invention also permits a greater "fine tuning" of the process for which it is employed, in that hitherto the feed rate of the molten material has been the one major parameter which has proven most difficult to control and to maintain satisfactorily uniform over the entire length of a tapping operation. The reserve capacity provided by the second rotor ensures that this feed rate for the first rotor will not increase above a predetermined value, and consequently permits more precise determination of the optimum first rotor diameter, vane number, vane configuration and vane tip speed for maximum pelletization. Again, since the first rotor is always operative at about maximum loading it is relatively simpler to ensure that the material/water ratio remains within the values for optimum pelletization; this problem will remain with the second rotor but the output of this portion is a fraction of the whole, whereas previously this problem was encountered with the entire output of the single rotor.

Although in this embodiment two rotors and their feed plates are employed a third rotor and feed plate could be stacked above the existing two to give even greater flexibility and to ensure that the rotors in use are always loaded as much as possible to a relatively high constant capacity. Again, although in the described embodiment the excess material is fed to the upper of the two rotors, it is instead possible for the principal flow to be to an upper rotor, while the excess flow is to a lower rotor.

In commercial operation it is desirable to control the quality of the pelletized slag to suit the intended end use. Thus, pellets that are more amorphous in character are produced by increasing the amount of water used and also the rotor speed, while reduction in water used and rotor speed will result in pellets that are more crystalline in character. The splitting of the slag stream provided by the apparatus of the invention makes it possible to have better interaction between the water and slag, and thereby permits greater control over slag quality as to whether the pelletized material is more amorphous or more crystalline.

We claim:

1. Apparatus for the pelletization of molten heat-liquifiable solid material comprising:
   an apparatus frame,
   feed means providing a primary discharge means for molten material fed thereto up to a predetermined flow rate, and a secondary discharge means for excess molten material when the flow rate of the material fed thereto is greater than said predetermined flow rate,
   first and second feed plates mounted by the frame one above the other to receive respectively material from the primary and secondary discharge means and providing respective first and second feed surfaces over which the received molten material flows under gravity,
   first and second radially-vaned projecting rotors mounted by the frame for rotation about respective horizontal axes and on to the respective peripheries of which the molten material is fed respectively from the first and second feed surfaces for projection into the air for cooling and pellitization thereof, and
   motor means for rotating the two rotors about their respective axes in the respective required directions.

2. Apparatus as claimed in claim 1, wherein the said second rotor and its respective feed plate are mounted above the first rotor and its respective feed plate.

3. Apparatus as claimed in claim 1, wherein the second rotor is of smaller diameter than the first rotor, and has fewer vanes than the first rotor so as to maintain substantially the same vane size for the two rotors.

4. Apparatus as claimed in claim 1, wherein the second rotor is of smaller diameter than the first rotor and is rotated at a higher number of revolutions per minute so as to achieve substantially the same peripheral speed.

5. Apparatus as claimed in claim 1, wherein the second rotor is of smaller diameter than the first rotor, and has fewer vanes than the first rotor so as to maintain substantially the same vane size for the two rotors, and wherein the second rotor is rotated at a higher number of revolutions per minute so as to achieve substantially the same peripherial speed.

6. Apparatus as claimed in claim 1, wherein the second rotor is of smaller diameter than the first rotor, and has fewer vanes than the first rotor and wherein the second rotor is rotated at a higher number of revolutions per minute so as to achieve substantially the same frequency of vane impact on the respective stream.

7. Apparatus as claimed in claim 1, wherein the said first and second feed plates are connected together, and are mounted by the apparatus frame for vibration having at least a vertical component to inhibit adhesion of the molten material to the feed surfaces.

8. Apparatus as claimed in claim 7, wherein the said feed plates are mounted on the apparatus frame for the said vibration thereof via compression springs having their compression axes vertical, and a motor driven eccentric weight is mounted on the feed plate means to produce vibration thereof upon rotation of the weight.

* * * * *